United States Patent
Nadamoto

(10) Patent No.: US 11,146,729 B2
(45) Date of Patent: Oct. 12, 2021

(54) CAMERA AND LENS APPARATUS HAVING AN IMAGE BLUR CORRECTION FUNCTION

(71) Applicant: CANON KABUSHIKI KAISHA, Tokyo (JP)

(72) Inventor: Ken Nadamoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/555,177

(22) Filed: Aug. 29, 2019

(65) Prior Publication Data

US 2020/0084358 A1    Mar. 12, 2020

(30) Foreign Application Priority Data

Sep. 7, 2018   (JP) .............................. JP2018-167529

(51) Int. Cl.
*H04N 5/232* (2006.01)
*H04N 5/225* (2006.01)

(52) U.S. Cl.
CPC ......... *H04N 5/2327* (2013.01); *H04N 5/2253* (2013.01); *H04N 5/2254* (2013.01); *H04N 5/23254* (2013.01); *H04N 5/23287* (2013.01)

(58) Field of Classification Search
CPC ............... H04N 5/2327; H04N 5/2254; H04N 5/23287; H04N 5/23254; H04N 5/2253
See application file for complete search history.

(56) References Cited

U.S. PATENT DOCUMENTS

| 6,985,177 B2 | 1/2006 | Takahashi | |
|---|---|---|---|
| 2002/0080242 A1 | 6/2002 | Takahashi | |
| 2011/0216227 A1* | 9/2011 | Ikeda | H04N 5/232 348/241 |
| 2015/0264266 A1* | 9/2015 | Katsuyama | H04N 5/23209 348/208.2 |

(Continued)

FOREIGN PATENT DOCUMENTS

| CN | 101943836 A | 1/2011 |
|---|---|---|
| CN | 103384309 A | 11/2013 |

(Continued)

OTHER PUBLICATIONS

Extended European Search Report issued in European Appln. No. 19195533.5 dated Dec. 9, 2019.

(Continued)

*Primary Examiner* — Luong T Nguyen
(74) *Attorney, Agent, or Firm* — Rossi, Kimms & McDowell LLP

(57) ABSTRACT

The camera is used in a camera system including the camera that includes an image sensor movable for image blur correction, and a lens apparatus that is detachably attachable to the camera and includes an optical element movable for the image blur correction. The camera includes a setting unit configured to set a ratio of image blur correction amounts provided respectively by movements of the optical element and the image sensor in each of their moving directions, using information on an image circle formed by the lens apparatus, information on a mechanical movable amount of the image sensor, and information on a size of a signal readout area of the image sensor.

22 Claims, 11 Drawing Sheets

(56) References Cited

U.S. PATENT DOCUMENTS

| | | | | |
|---|---|---|---|---|
| 2016/0057351 A1* | 2/2016 | Noguchi | ............ | H04N 5/23287 |
| | | | | 348/208.4 |
| 2016/0330378 A1* | 11/2016 | Tsuchiya | ............ | H04N 5/23258 |
| 2017/0019600 A1 | 1/2017 | Koyano | | |
| 2017/0054894 A1* | 2/2017 | Takanashi | ........ | H04N 5/232122 |

FOREIGN PATENT DOCUMENTS

| | | | |
|---|---|---|---|
| CN | 106353949 A | 1/2017 | |
| JP | 2001257930 A | 9/2001 | |
| JP | 2009086494 A | 4/2009 | |
| JP | 2009139877 A | 6/2009 | |
| JP | 2009265182 A | 11/2009 | |

OTHER PUBLICATIONS

Office Action issued in Russian Appln. No. 2019127790 dated Jun. 16, 2020. English translation provided.

Search Report issued in Russian Appln. No. 2019127790 dated Jun. 9, 2020. English translation provided.

Office Action issued in Chinese Appln. No. 201910843066.X dated Mar. 23, 2021. English translation provided.

* cited by examiner

CAMERA AND LENS APPARATUS HAVING AN IMAGE BLUR CORRECTION FUNCTION

BACKGROUND OF THE INVENTION

Field of the Invention

The present invention relates to optical apparatuses, that is, lens apparatuses and cameras used in camera systems having an image blur correction function.

Description of the Related Art

Lens-interchangeable camera system having an image blur correction function for optically reducing (correcting) an image blur include one that moves a correction lens provided in an interchangeable lens with respect to its optical axis and moves an image sensor provided in a camera respect to the optical axis.

However, a movable amount of the correction lens is mechanically limited, and a movable amount of the image sensor is limited by, in addition to its mechanical limitation, an image circle formed by the interchangeable lens. Japanese Patent Laid-Open No. 2009-265182 discloses a camera system that changes, depending on movable amounts of a correction lens and an image sensor, a ratio (correction ratio) between image blur correction amounts respectively provided by movements of the correction lens and the image sensor.

Further, in the lens interchangeable camera system, the center of the image circle may be shifted from the center of the image sensor due to manufacturing errors of the interchangeable lens. Japanese Patent Laid-Open No. 2009-139877 discloses a camera in which an image sensor captures a chart image formed by an interchangeable lens, and moves, using the captured chart image, an initial movement position of the image sensor from its original center position.

However, the shift amount and the shift direction of the center of the image circle are different in each individual interchangeable lens. As a result, the movable amount of the image sensor when moving within an area of the image circle also differs depending on its moving direction (+ and − directions). For this reason, if the correction ratio is set simply depending on the movable amounts of the correction lens and the image sensor as disclosed in Japanese Patent Laid-Open No. 2009-265182, insufficient image blur correction may be performed. Further, even if the initial movement position of the image sensor is moved from the original center position, the movable amounts of the image sensor in its moving direction are mutually different.

SUMMARY OF THE INVENTION

The present invention provides a camera and a lens apparatus (an optical apparatus) each capable of effectively utilizing a movable amount of an image sensor even when the center of the image circle is shifted from the center of the image sensor.

The present invention provides as an aspect thereof a camera used in a camera system including the camera that includes an image sensor movable for image blur correction, and a lens apparatus that is detachably attachable to the camera and includes an optical element movable for the image blur correction. The camera includes a setting unit configured to set a ratio of image blur correction amounts provided respectively by movements of the optical element and the image sensor in each of their moving directions, using information on an image circle formed by the lens apparatus, information on a mechanical movable amount of the image sensor, and information on a size of a signal readout area of the image sensor.

The present invention provides as another aspect thereof a lens apparatus used in a camera system including a camera that includes an image sensor movable for image blur correction, and the lens apparatus that is detachably attachable to the camera and includes an optical element movable for the image blur correction. The lens apparatus includes a setting unit configured to set a ratio of image blur correction amounts provided respectively by movements of the optical element and the image sensor in each of their moving directions, using information on an image circle formed by the lens apparatus, information on a mechanical movable amount of the image sensor, and information on a size of a signal readout area of the image sensor.

The present invention provides as yet another aspect thereof a camera used in a camera system including the camera that includes an image sensor movable for image blur correction, and a lens apparatus that is detachably attachable to the camera and includes an optical element movable for the image blur correction. The camera includes a control unit configured to move an initial position of movement of the image sensor to a position at which movable amounts of the image sensor in its moving directions become mutually equal, using information on an image circle formed by the lens apparatus.

The present invention provides as still another aspect thereof a method of controlling a camera used in a camera system including the camera that includes an image sensor movable for image blur correction, and a lens apparatus that is detachably attachable to the camera and includes an optical element movable for the image blur correction. The method includes the step of acquiring information on an image circle formed by the lens apparatus, information on a mechanical movable amount of the image sensor, and information on a size of a signal readout area of the image sensor, and the step of setting a ratio of image blur correction amounts provided respectively by movements of the optical element and the image sensor in each of their moving directions, using the information on the image circle, the information on the mechanical movable amount, and the information on the size of the signal readout area.

The present invention provides as yet still another aspect thereof a method of controlling a lens apparatus used in a camera system including a camera that includes an image sensor movable for image blur correction, and the lens apparatus that is detachably attachable to the camera and includes an optical element movable for the image blur correction. The method includes the step of acquiring information on an image circle formed by the lens apparatus, information on a mechanical movable amount of the image sensor, and information on a size of a signal readout area of the image sensor, and the step of setting a ratio of image blur correction amounts provided respectively by movements of the optical element and the image sensor in each of their moving directions, using the information on the image circle, the information on the mechanical movable amount, and the information on the size of a signal readout area.

The present invention provides as further another aspect thereof a method of controlling a camera used in a camera system including the camera that includes an image sensor movable for image blur correction, and a lens apparatus that is detachably attachable to the camera and includes an optical element movable for the image blur correction. The method includes the step of acquiring information on an image circle formed by the lens apparatus, and the step of moving the image sensor to a position at which movable amounts of the image sensor in its moving directions become mutually equal, using the information on the image circle.

The present invention provides as yet further another aspect thereof a computer-readable non-transitory storage medium storing a program for causing a camera or a lens apparatus to execute a process according to any one of the above methods.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 1:
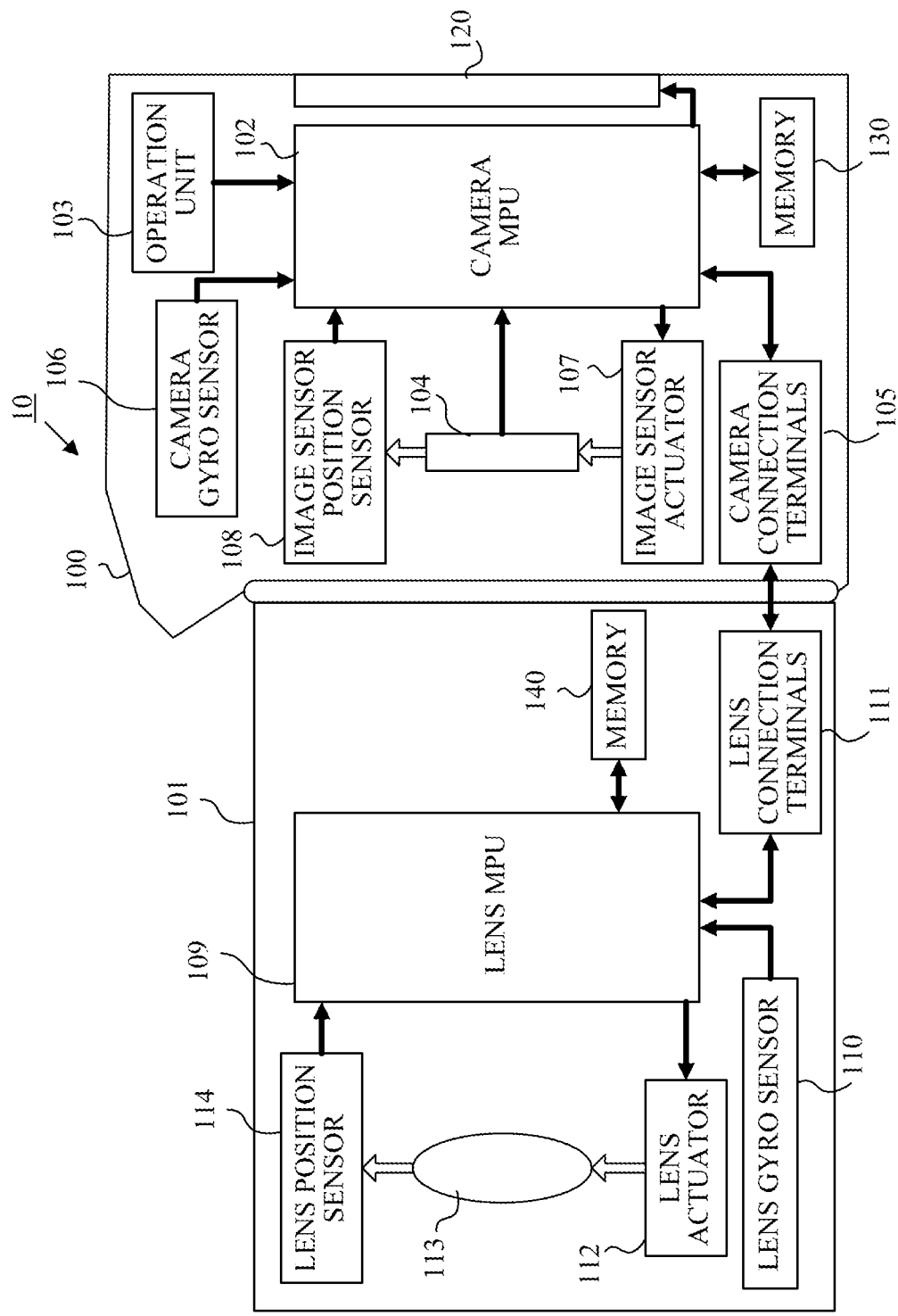
FIG. 1 is a block diagram illustrating a configuration of a camera system that is Embodiment 1 of the present invention.

FIG. 1 illustrates a configuration of a camera system 10 that is a first embodiment (Embodiment 1) of the present invention. The camera system 10 includes an interchangeable lens 101 as a lens apparatus and a first optical apparatus (one optical apparatus), and a camera body 100 as a camera and a second optical apparatus (another optical device) to which the interchangeable lens 101 is detachably and communicably attached (connected). The camera body 100 includes a camera MPU 102, an operation unit 103, an image sensor 104, camera connection terminals 105, a camera gyro sensor 106, and a back display 120.

A camera MPU (camera control unit) 102 is a computer that governs overall control of the camera body 100 and the interchangeable lens 101, and controls various operations such as AE, AF, and image capturing in response to inputs from the operation unit 103. The camera MPU 102 communicates various commands and information with a lens MPU (lens control unit) 109 as a computer through the camera connection terminals 105 and lens connection terminals 111 provided in the interchangeable lens 101. The camera connection terminals 105 and the lens connection terminals 111 include a power supply terminal for supplying power from the camera body 100 to the interchangeable lens 101.

The operation unit 103 includes a mode dial for setting various image-capturing modes, a release button for instructing start of an image-capturing preparation operation and an image-capturing operation, and other operation members. When the release button is half-pressed, a first switch (SW1) is turned on. When the release button is full-pressed, a second switch (SW2) is turned on. In response to turning-on of SW1, the image-capturing preparation operation (AE and AF) is performed. In response to turning-on of SW2, the start of the image-capturing (exposure) operation is instructed, and after a predetermined time from the instruction the image-capturing operation is started. The on/off of SW1 and SW2 is notified from the camera MPU 102 to the lens MPU 109 by communication therebetween.

The image sensor 104 is constituted by a photoelectric conversion element such as a CCD sensor or a CMOS sensor, and photoelectrically converts an object image formed by an image-capturing optical system described later to generate an image-capturing signal. The camera MPU 102 generates a still image or a moving image (video signal) using the image-capturing signal from the image sensor 104.

The camera gyro sensor 106 is a shake sensor that detects angular shake of the camera body 100 (hereinafter referred to as "camera shake") due to user's hand jiggling or the like to output a camera shake detection signal as an angular velocity signal. The camera MPU 102 drives an image sensor actuator 107 depending on the camera shake detection signal and on an IIS correction ratio (described later) received from the interchangeable lens 101 to move the image sensor 104 in a direction orthogonal to an optical axis of the image-capturing optical system (or a direction including a directional component orthogonal to the optical axis). The movement of the image sensor 104 reduces (corrects) image blur caused by the camera shake.

When moving the image sensor 104, the camera MPU 102 performs feedback control of the image sensor actuator 107 such that a position of the image sensor 104 (a movement amount thereof from a position on the optical axis that is a movement center) detected by an image sensor position sensor 108 approaches a target position. Thereby, image blur correction (hereinafter referred to as "IIS") by the movement of the image sensor 104 is performed. The IIS is performed in response to camera shake in a vertical (pitch) direction and a horizontal (yaw) direction.

The rear display 120 constituted by a display device displays a moving image corresponding to the video signal generated by the camera MPU 102 using the image-capturing signal from the image sensor 104. Before image capturing, the rear display 120 displays a viewfinder image (live-view image) that user can observe. In addition, after image capturing, the rear display 120 can display a still image or a moving image for recording generated by the image capturing. The word "image capturing" in this embodiment means image capturing for recording.

The interchangeable lens 101 includes the image-capturing optical system (not illustrated, the lens MPU 109 and the lens connection terminal 111s described above, and a lens gyro sensor 110. The lens gyro sensor 110 is a shake sensor that detects angular shake of the interchangeable lens 101 (hereinafter referred to as "a lens shake") to output a lens shake detection signal as an angular velocity signal.

The lens MPU 109 drives a lens actuator 112 depending on the lens shake detection signal and an OIS correction ratio (described later) to move a correction lens 113 as an optical element that is a part of the image-capturing optical system in a direction orthogonal to an optical axis of the image-capturing optical system. The movement of the correction lens 113 reduces (corrects) image blur caused by the lens shake. When moving the correction lens 113, the lens MPU 109 performs feedback control of the lens actuator 112 such that a position of the correction lens 113 (a movement amount thereof from a position on the optical axis that is a movement center) detected by a lens position sensor 114 approaches a target position. Thereby, image blur correction by the movement of the correction lens 113 (hereinafter referred to as "OIS") is performed.

The OIS is performed, as with the IIS, in response to lens shake in the pitch direction and the yaw direction. The correction lens 113 may be moved in the direction orthogonal to the optical axis by being moved in parallel in a plane orthogonal to the optical axis or by being rotated about a point on the optical axis.

Next, description will be made of a controlled movable amount of the image sensor 104 (hereinafter referred to as "an IIS movable amount") set depending on a relation between a center position of an image circle formed by the interchangeable lens 101 and a center position of a mechanical movable range of the image sensor 104 in the IIS (hereinafter referred to as "an IIS mechanical stroke range"). In the following description, an image blur correctable amount provided by the IIS, which is obtained from the IIS movable amount, is referred to as "an IIS correctable amount". Further, an image blur correctable amount provided by the OIS, which is obtained from a mechanical or controlled movable range of the correction lens 113, is hereinafter referred to as "an OIS correctable amount".

In this embodiment, the IIS correctable amount and the OIS correctable amount are expressed as angle (in deg). Further, the above-mentioned IIS correction ratio is a ratio of the IIS correctable amount to a total image blur correctable amount by both the IIS and the OIS, and the OIS correction ratio is a ratio of the OIS correctable amount to the total image blur correctable amount.

Figure 2:
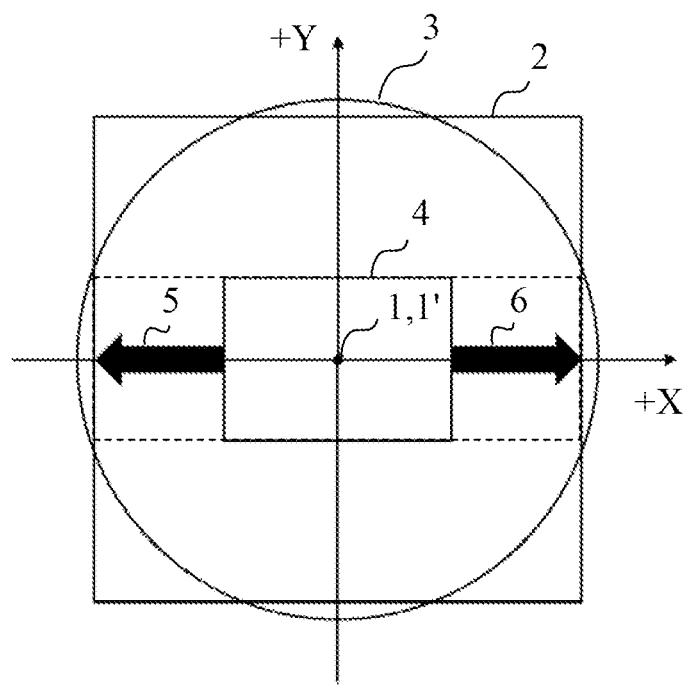
FIG. 2 illustrates an IIS movable amount when the center of an image circle of an interchangeable lens is not shifted with respect to the center of an IIS mechanical stroke range.
Figure 3:
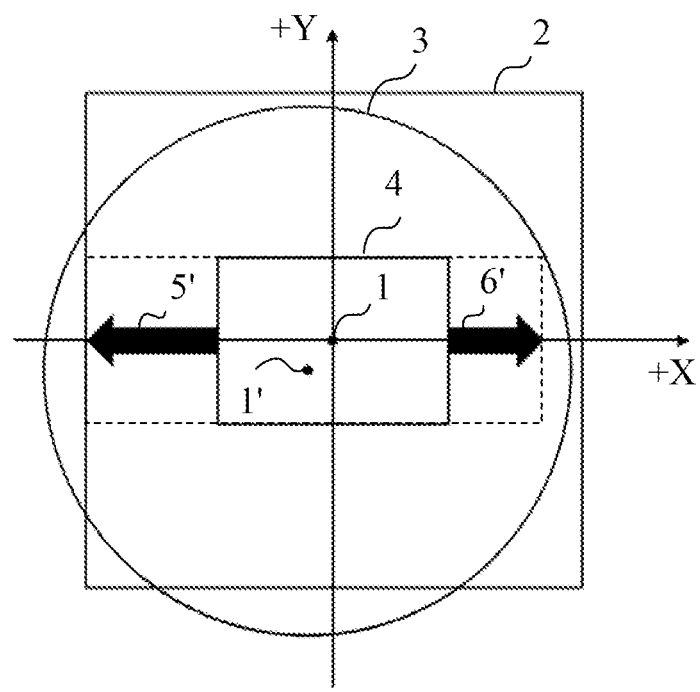
FIG. 3 illustrates an IIS movable amount when the center of the image circle of the interchangeable lens is shifted with respect to the center of the IIS mechanical stroke range.

FIG. 2 illustrates the IIS moveable amount in an ideal case where the center position 1' of the image circle 3 coincides with the center position 1 of the IIS mechanical stroke range 2. In FIG. 2 and FIG. 3 described later, the right direction is a +X direction, the left direction is a −X direction, the upper direction is a +Y direction, and the lower direction is a −Y direction.

In the IIS, a signal readout area in an image-capturing surface of the image sensor 104 from which the image-capturing signal for generating display images or recording images (the area is hereinafter referred to as "a sensor readout area") 4 can be moved within the image circle 3 and within the IIS mechanical stroke range 2. In FIG. 2, the IIS movable amount 5 in the +X direction and the IIS movable amount 6 in the −X direction are equal to each other. Thus, the IIS correction ratio in the +X direction and the IIS correction ratio in the −X direction are also equal to each other. The same applies to the +Y direction and the −Y direction.

On the other hand, FIG. 3 illustrates a case where the center position 1' of the image circle 3 is shifted with respect to the center position 1 of the IIS mechanical stroke range 2 to the lower left due to manufacturing errors or the like of the interchangeable lens 101. In this case, the IIS movable amount 6' in the +X direction and the IIS movable amount 5' in the −X direction are different from each other (specifically, the IIS movable amount 6' is smaller than the IIS movable amount 5'). Therefore, the IIS correction ratio in the +X direction and the IIS correction ratio in the −X direction are also different from each other. In such a case, even if the IIS correction ratio is set without considering the shift of the image circle, in other words, moving directions of the image sensor 104, the IIS correction ratio cannot be realized in one of the +X and the −X directions.

Specifically, in one of the +X and the −X directions, an IIS correction ratio larger than an actually obtainable IIS correction ratio is set, and thus the sensor movable amount cannot be sufficiently used. Further, due to the above large IIS correction ratio, when the OIS correction ratio smaller than an actually obtainable OIS correction ratio is set, the OIS correctable amount cannot be sufficiently used. As a result, sufficient image blur correction cannot be performed. The same applies to the +Y and −Y directions. In order to solve such a problem, this embodiment performs the following process.

Figure 4:
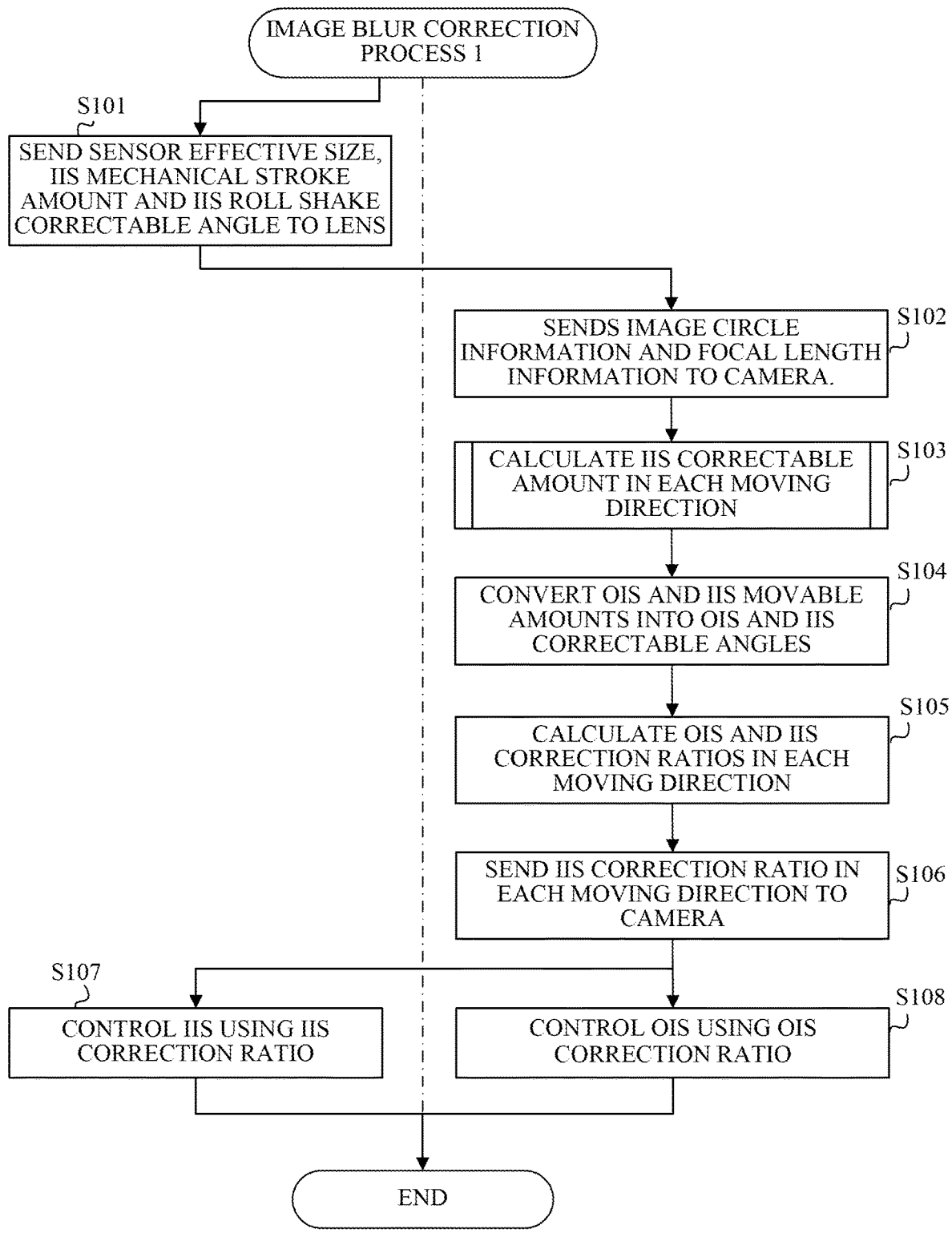
FIG. 4 is a flowchart of an image blur correction process performed in Embodiment 1.

FIG. 4 illustrates a flowchart of an image blur correction process 1 performed by the camera body 100 (camera MPU 102) and the interchangeable lens 101 (lens MPU 109). The process performed by the camera MPU 102 is illustrated on the left side of FIG. 4, and the process performed by the lens MPU 109 is illustrated on the right side thereof. The camera MPU 102 and the lens MPU 109 execute the respective processes according to computer programs stored in the memories 130 and 140 respectively provided in the camera body 100 and the interchangeable lens 101.

When the camera body 100 is powered on to supply power to the interchangeable lens 101 and communication between the camera MPU 102 and the lens MPU 109 is started, the camera MPU 102 starts this process at step S101. Although the image blur correction process in the X direction will be described below, the same image blur correction process is performed in the Y direction. The same applies to other processes (flow charts) that will be described later.

At step S101, the camera MPU 102 sends, to the lens MPU 109, a sensor effective size, a mechanical movable stroke amount of the image sensor 104 in the IIS (hereinafter referred to as "an IIS mechanical stroke amount"), and a roll shake correctable angle in the IIS (hereinafter referred to as "an IIS roll shake correctable angle"). The sensor effective size is a size (a horizontal width and a vertical width) of the above-described sensor readout area 4 in the image sensor 104. The roll shake correctable angle is a maximum correctable angle in roll shake correction (roll correction) by the IIS for correcting image blur due to the roll shake that is rotational shake around a center of the image sensor 104 (sensor readout area). In this way, the lens MPU 109 acquires (receives) the sensor effective size, the IIS mechanical stroke amount, and the IIS roll shake correctable angle.

Next at step S102, the lens MPU 109 sends, to the camera MPU 102, information on the image circle of the interchangeable lens 101 (image-capturing optical system), and information on a focal length of the interchangeable lens 101. The information on the image circle is hereinafter referred to as "image circle information", and the information on the focal length is hereinafter referred to as "focal length information".

The image circle information includes at least information on an actual center position of the image circle that is shifted from a center position of a designed image circle, that is, the center position of the sensor readout area of the image sensor 104 due to manufacturing errors or the like. In this embodiment, the image circle information further includes information on a radius of the image circle. The image circle information may include information on a diameter of the image circle because the radius can be calculated from the diameter. The image circle information is required when the camera MPU 102 later calculates the IIS movable range. Further, the image circle information may change depending on image-capturing conditions such as a focal length, a focus position and an aperture diameter of the image-capturing optical system, and a posture of the camera system. Therefore, it is desirable that the image circle information sent from the lens MPU 109 to the camera MPU 102 be associated with a value of at least one of parameters of the image-capturing conditions.

The focal length information is information indicating the focal length of the image-capturing optical system, and is required to convert an image blur correction amount (angle) provided by the movement of the image sensor 104 into a movement amount of the image sensor 104 in control of the IIS.

Figure 5:
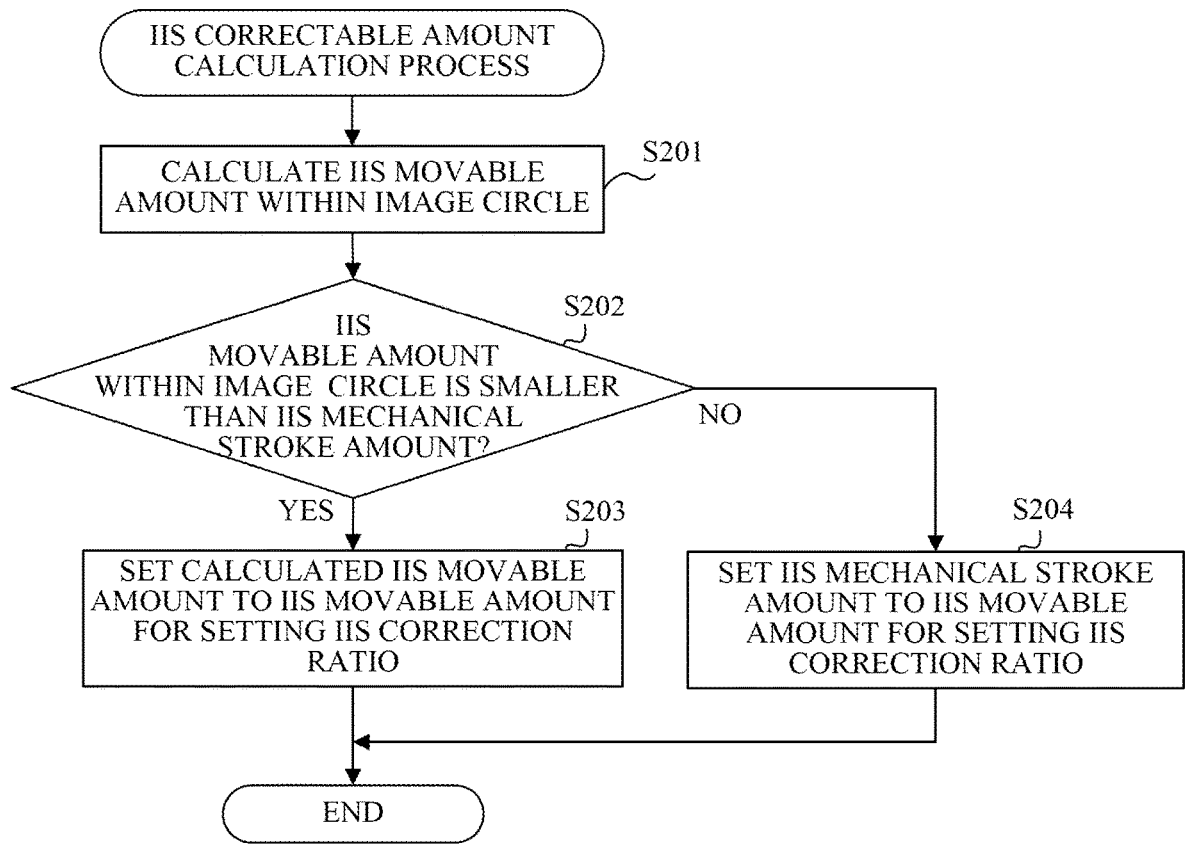
FIG. 5 is a flowchart of an IIS movable amount calculation process performed in Embodiment 1.

At step S103, the lens MPU 109 calculates the IIS correctable amount (angle) of the image sensor 104 in each of its moving directions (+X and −X directions). Description will be made of a method of calculating the IIS correctable amount with reference to a flowchart of FIG. 5

At step S201, the lens MPU 109 calculates the IIS movable amount such that the sensor readout area 4 does not protrude from the image circle 3 in each of the moving directions. When the IIS roll shake correctable angle sent from the camera MPU 102 at step S101 is set to 0, and thereby the roll shake correction is not performed by the IIS, the lens MPU 109 calculates the IIS movable amount 6' in the + direction and the IIS movable amount 5' in the − direction in FIG. 3.

Figure 6:
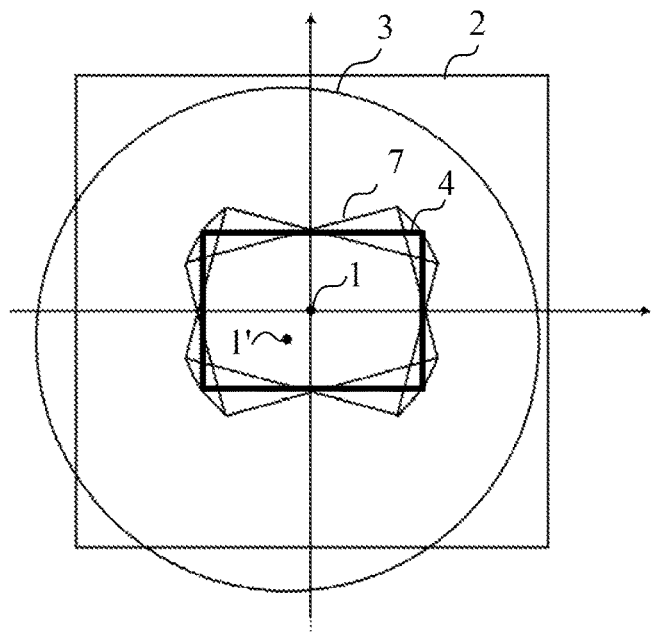
FIG. 6 illustrates a sensor readout area when roll shake correction is performed by IIS in Embodiment 1.

When the IIS performs the roll shake correction, the camera MPU 102 sends, to the lens MPU 109, a roll shake correction angle in the IIS, and the lens MPU 109 calculates the IIS movable amounts 5'and 6' in consideration of the roll shake correction angle. FIG. 6 illustrates a range 7 in which the sensor readout area 4 can be moved (rotated) when the IIS performs the roll shake correction. Reference numerals 1, 1' to 4 are the same as those in FIG. 3.

The range 7 in which the sensor readout area 4 can be rotated is calculated from the sensor effective size and the IIS roll shake correctable angle. Specifically, the IIS movable amount is calculated such that the range 7 in which the sensor readout area 4 can be rotated does not protrude from the image circle 3 in each of the moving directions (+X and −X directions).

Next, at step S202, the lens MPU 109 determines whether or not the IIS movable amount in each of the moving directions calculated from the sensor effective size and the image circle information is smaller than the IIS mechanical stroke amount. If the IIS movable amount is smaller than the IIS mechanical stroke amount, the lens MPU 109 proceeds to step S203.

At step S203, the lens MPU 109 sets the IIS movable amount calculated from the sensor effective size and the image circle information to the IIS movable amount used for setting the IIS correction ratio. When the IIS movable amount is larger than the IIS mechanical stroke amount, the lens MPU 109 proceeds to step S204 to set a mechanical movable amount, which corresponds to the mechanical stroke amount, to the IIS movable amount to be used for setting the IIS correction ratio.

Next at step S104 in FIG. 4, the lens MPU 109 converts, using the focal length information of the image-capturing optical system, the OIS movable amount into the OIS correctable angle $\theta_{OIS}$. In the following description, the OIS correctable angle $\theta_{OIS}$ when the correction lens 113 is moved with respect to the optical axis in the +X direction is referred to as "an OIS+correctable angle $\theta_{OIS}^{+}$", and the OIS correctable angle $\theta_{OIS}$ when the correction lens 113 is moved in the −X direction is referred to as "an OIS− correctable angle $\theta_{OIS}^{-}$".

In addition, at this step, the lens MPU 109 converts, using the focal length information of the image-capturing optical system, the IIS movable amount into the IIS correctable angle $\theta_{IIS}$. In the following description, the IIS correctable angle $\theta_{IIS}$ when the image sensor 104 is moved in the +X direction from the initial position (center position of the sensor readout area 4) is referred to as "an IIS+ correctable angle $\theta_{IIS}^{+}$", and the IIS correctable angle $\theta_{IIS}$ when the image sensor 104 is moved in the −X direction is referred to as "an IIS− correctable angle $\theta_{IIS}^{-}$". Since the IIS movable amount differs depending on the moving direction of the image sensor 104, the IIS correctable angle also differs depending on the moving direction.

Next at step S105, the lens MPU 109 as a setting unit calculates (sets) the OIS correction ratio and the IIS correction ratio in each of the moving directions of the correction lens 113 and the image sensor 104. The OIS correction ratio indicates a ratio of an image blur correction amount (angle [deg]) provided by the OIS (hereinafter referred to as "an OIS correction amount") to a total image blur correction amount provided by both the OIS and the IIS. Further, the IIS correction ratio indicates a ratio of an image blur correction amount provided by the IIS (hereinafter referred to as "an IIS correction amount") to the total image blur correction amount.

The OIS+ correction ratio, the OIS− correction ratio, the IIS+ correction ratio, and the IIS− correction ratio are calculated as follows:

OIS+ correction ratio: $\theta_{OIS}^{+}/(\theta_{IIS}^{+}+\theta_{OIS}^{+})$
OIS− correction ratio: $\theta_{OIS}^{-}/(\theta_{IIS}^{-}+\theta_{OIS}^{-})$
IIS+ correction ratio: $\theta_{IIS}^{+}/(\theta_{IIS}^{+}+\theta_{OIS}^{-})$
IIS− correction ratio: $\theta_{IIS}^{-}/(\theta_{IIS}^{-}+\theta_{OIS}^{-})$ Next at step S106, the lens MPU 109 sends the IIS+ correction ratio and the IIS− correction ratio calculated at step S105 to the camera MPU 102. Then, at step S107, the camera MPU 102 controls the IIS using the IIS+ correction ratio and the IIS− correction ratio acquired (received) from the lens MPU 109 at step S106. Specifically, the camera MPU 102 calculates the IIS correction amount depending on the camera shake detected by the camera gyro sensor 106 and the IIS± correction ratios. Thereafter the camera MPU 102 controls the image sensor actuator 107 to move the image sensor 104 to a target position corresponding to the IIS correction amount.

At the same time as step S107, at step S108, the lens MPU 109 controls the OIS using the OIS+ correction ratio and the OIS− correction ratio calculated at step S105. Specifically, the lens MPU 109 calculates the OIS correction amount depending on the lens shake detected by the lens gyro sensor 110 and the OIS± correction ratios. Thereafter, the lens MPU 109 controls the lens actuator 112 to move the correction lens 113 to a target position corresponding to the OIS correction amount.

Thus, cooperative image blur correction by the OIS and the IIS, that is, by the correction lens 113 and the image sensor 104 is performed.

Figure 7:
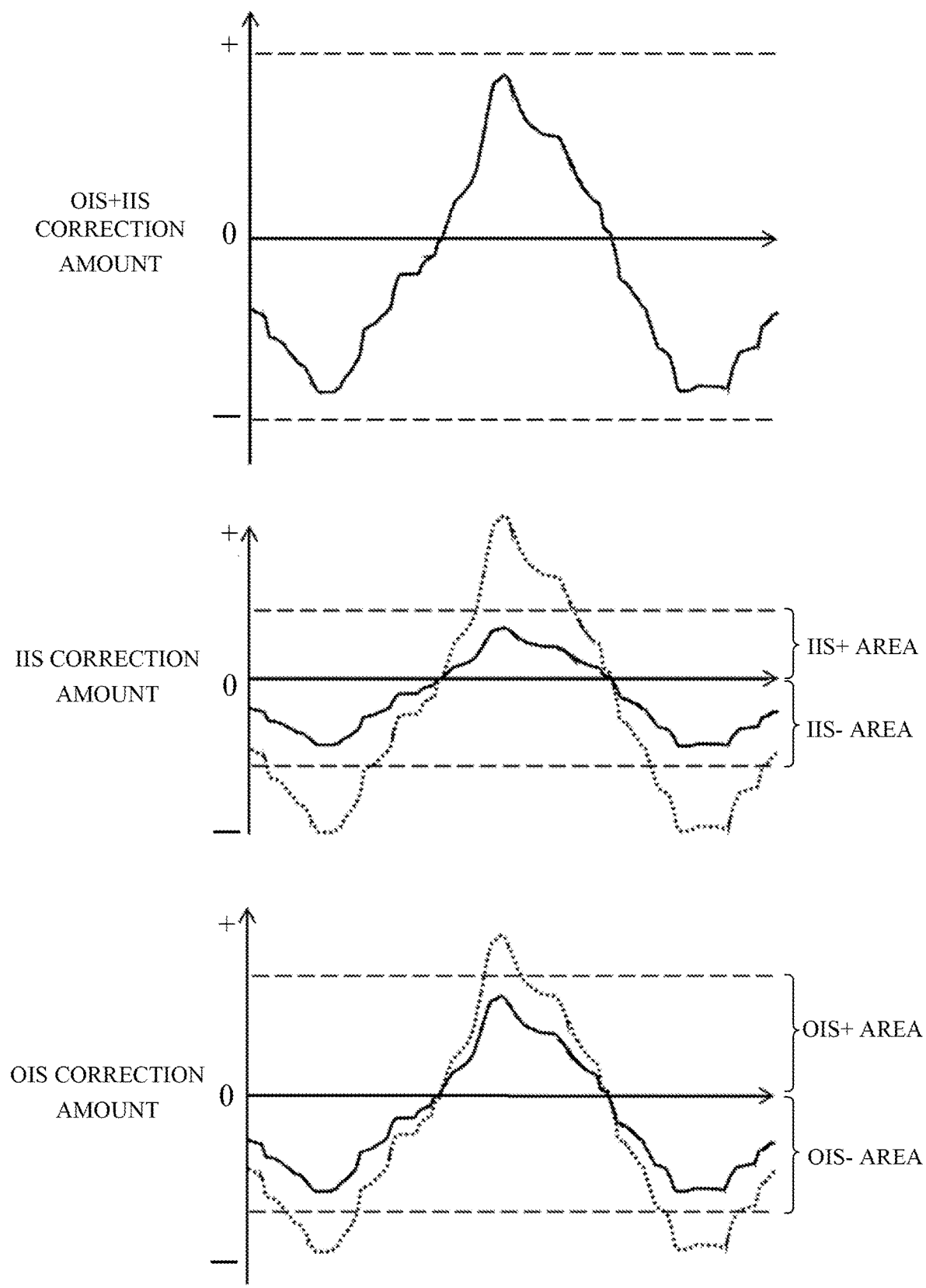
FIG. 7 illustrates an example of image blur correction performed by movements of a correction lens and an image sensor in Embodiment 1.

Next, with reference to FIG. 7, description will be made of the cooperative coordinated image blur correction by the OIS and the IIS. The middle part of FIG. 7 illustrates changes in the IIS correction amount by a solid line. Further, the lower part of FIG. 7 illustrates changes in the OIS correction amount by a solid line. Further, the upper part of FIG. 7 illustrates the total image blur correction amount that is the sum of the IIS correction amount illustrated in the middle part of FIG. 7 and the OIS correction amount illustrated in the lower part thereof, and the total image blur correction amount is illustrated by a dotted line in the middle and lower parts. In these drawings, "0" indicates the center position of a mechanical stroke range of the correction lens 113 (hereinafter referred to as "an OIS mechanical stroke range") and the IIS mechanical stroke range.

In the OIS, the correction lens 113 is moved depending on the lens shake in an OIS+ area and an OIS− area divided at the center position of the OIS mechanical stroke range. On the other hand, in the IIS, the image sensor 104 is moved depending on the camera shake in an IIS+ area and an IIS− area divided at the center position of the IIS mechanical stroke range (initial position).

As illustrated in the middle of FIG. 7, the IIS+ correction ratio when the image sensor 104 is moved in the IIS+ area and the IIS− correction ratio when the image sensor 104 is moved in the IIS− area are different from each other. That is, the lens MPU 109 sets, as the IIS+ correction ratio and the IIS− correction ratio, mutually different values depending on the IIS+ correctable angle $\theta_{IIS}^+$ and the IIS− correctable angle $\theta_{IIS}^-$. Since the IIS+ correction ratio and the IIS− correction ratio are different from each other, the OIS+ correction ratio when the correction lens 113 is moved in the OIS+ area and the OIS− correction ratio when the correction lens 113 is moved in the OIS− area are also different from each other.

As described above, in this embodiment, the IIS+ correction ratio and the IIS− correction ratio are set to appropriate values different from each other depending on the difference between the IIS+ correctable angle and the IIS− correctable angle caused by the shift of the image circle. As a result, the image blur correction can be performed by effectively utilizing the movable amounts of the correction lens 113 and the image sensor 104.

In this embodiment, when an optical state such as focus or zoom of the image-capturing optical system changes, the IIS and OIS correctable angles are recalculated. When the camera MPU 102 calculates the IIS and OIS correctable angles, the current optical state of the image-capturing optical system is periodically sent to the camera MPU 102, and the camera MPU 102 calculates the IIS and OIS correctable angles on the basis of the received optical state and the acquired image circle information. The same applies to the following embodiments.

Embodiment 2

In a camera system that is a second embodiment (Embodiment 2) of the present invention, the interchangeable lens 101 corresponds to a second optical apparatus and one optical apparatus, and the camera body 100 corresponds to a first optical apparatus and another optical apparatus. In Embodiment 2, the camera body 100 sets, using the OIS correctable angle, the image circle information and the focal distance information received from the interchangeable lens 101, the OIS correction ratio and the IIS correction ratio in each of the moving directions of the correction lens 113 and the image sensor 104. The interchangeable lens 101 controls the OIS depending on the OIS correction ratio received from the camera body 100. The camera system of this embodiment has the same configuration as that of the camera system of Embodiment 1, and the same constituent elements as those in Embodiment 1 are denoted by the same reference numerals as those in Embodiment 1.

Figure 8:
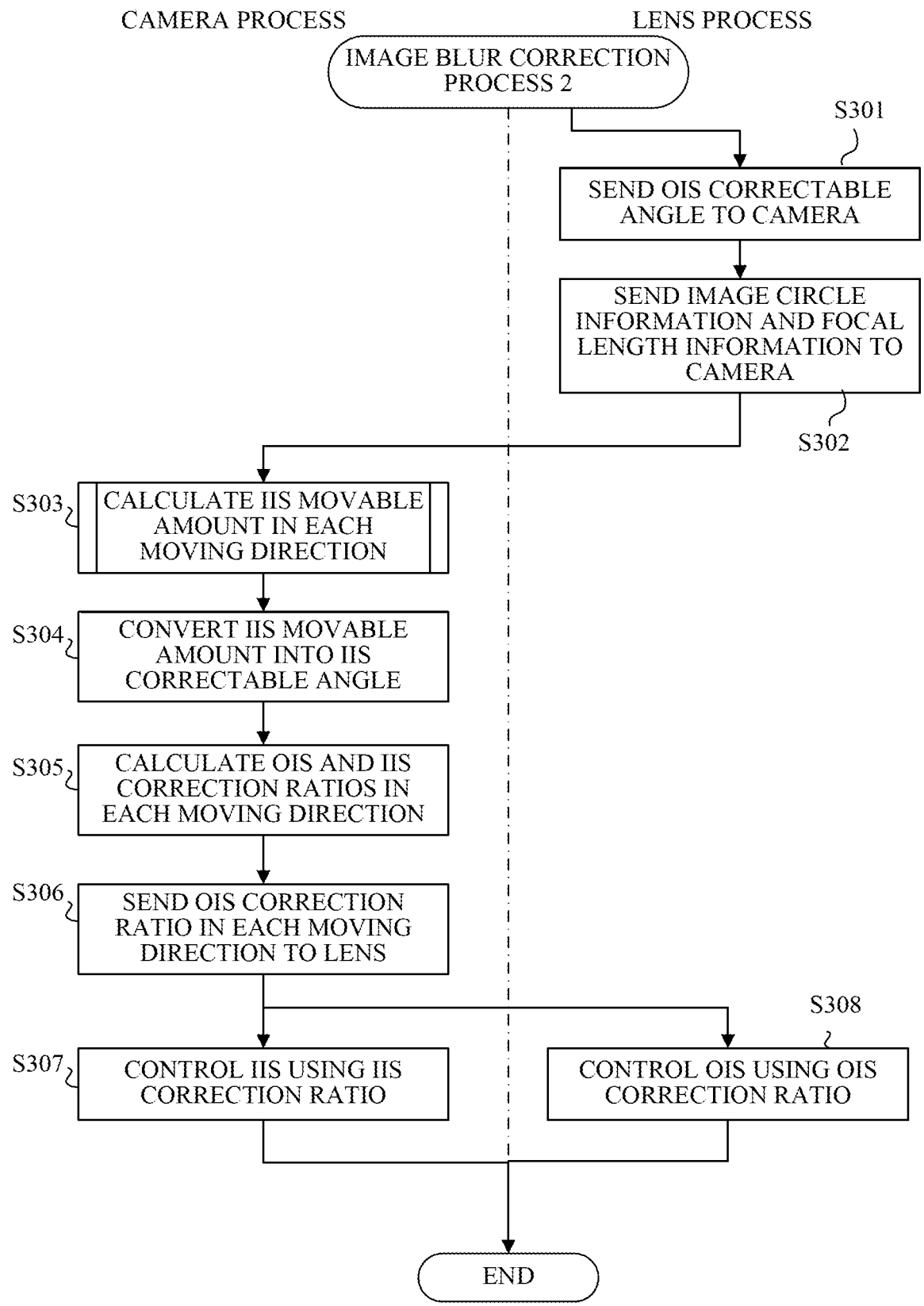
FIG. 8 is a flowchart of an image blur correction process performed in Embodiment 2 of the present invention.

FIG. 8 illustrates a flowchart of an image blur correction process 2 performed by the camera body 100 (camera MPU 102) and the interchangeable lens 101 (lens MPU 109). The process performed by the camera MPU 102 is illustrated on the left side of FIG. 8, and the process performed by the lens MPU 109 is illustrated on the right side thereof. The camera MPU 102 and the lens MPU 109 execute the respective processes according to computer programs.

When the camera body 100 is powered on to supply power to the interchangeable lens 101 and communication between the camera MPU 102 and the lens MPU 109 is started, the lens MPU 109 starts this process at step S301.

At step S301, the lens MPU 109 calculates the OIS correctable angle $\theta_{OIS}$ from the OIS movable amount and the focal length information, and sends the calculated OIS correctable angle $\theta_{OIS}$ to the camera MPU 102.

Next at step S302, the lens MPU 109 sends the image circle information and the focal length information to the camera MPU 102. The reason therefor is as described at step S102 in Embodiment 1. Thus, the camera MPU 102 acquires (receives) the image circle information and the focal length information.

Next at step S303, the camera MPU 102 calculates the IIS movable amount in each of the moving directions (+X and −X directions) of the image sensor 104. The calculation method of the IIS movable amount is the same as that described at step S103 in Embodiment 1.

Next at step S304, the camera MPU 102 converts, using the focal length information received from the lens MPU 109 at step S302, the IIS movable amount calculated at step S303 into the IIS correctable angle $\theta_{IIS}$.

Next at step S305, the camera MPU 102 as a setting unit calculates (sets) the OIS correction ratio (OIS+ and OIS− correction ratios) and the IIS correction ratio (IIS+ and IIS− correction ratios) in each of the moving directions. The calculation method thereof is the same as that described at step S105 in Embodiment 1.

Next at step S306, the camera MPU 102 sends the OIS+ and OIS− correction ratios calculated at step S305, to the lens MPU 109.

Then, at step S307, the camera MPU 102 controls the IIS using the IIS+ and IIS− correction ratios calculated at step S306, as at step S107 of the first embodiment.

At step S308 simultaneously with step S307, the lens MPU 109 controls the OIS using the OIS+ and OIS− correction ratios received from the camera MPU 102 at step S306 as at step S108 in Embodiment 1.

Thus, cooperative image blur correction by the OIS and the IIS, that is, by the correction lens 113 and the image sensor 104 is performed.

In this embodiment, the lens MPU 109 sends, to the camera MPU 102, an angle equivalent value as the OIS correctable angle. However, as another embodiment of the present invention, the lens MPU 109 may send, to the camera MPU 102, a movable amount [mm] of the correction lens 113 instead of the angle equivalent value. When sending the movable amount [mm], the lens MPU 109 separately sends, to the camera MPU 102, information on image blur correction sensitivity (sensitivity for converting the movement amount [mm] of the correction lens 113 into an angle [deg]). However, it is more desirable that the lens MPU 109 send the OIS correctable angle to the camera MPU 102 because it is possible to reduce a communication amount for the image blur correction sensitivity.

Embodiment 3

In a camera system that is a third embodiment (Embodiment 3) of the present invention, the interchangeable lens 101 corresponds to a first optical apparatus and one optical apparatus, and the camera body 100 corresponds to a second optical apparatus and another optical apparatus. In Embodiment 3, the camera body 100 performs electronic image blur correction (hereinafter referred to as "EIS") in addition to the IIS. The interchangeable lens 101 sets, using the sensor effective size and the IIS mechanical stroke amount received from the camera body 100, an OIS correction ratio and an IIS+EIS correction ratio as a total correction ratio of the IIS and EIS performed by the camera body 100. The camera body 100 controls the IIS and the EIS depending on the IIS+EIS correction ratio received from the interchangeable lens 101.

This embodiment is different from the other embodiments in that it is necessary that the lens MPU 109 sets each correction ration in consideration of not only the OIS correctable angle and the IIS correctable angle but also a correctable angle by the EIS (hereinafter referred to as "an EIS correctable angle"). Further, in Embodiment 1, it is necessary that the camera MPU 102 sends the IIS roll shake correctable angle to the lens MPU 109, and that the lens MPU 109 calculates the IIS movable amount in consideration of the IIS roll shake correctable angle.

On the other hand, in Embodiment 3, the lens MPU 109 calculates each correction ratio without receiving the EIS correctable angle and the IIS roll shake correctable angle from the camera MPU 102. This makes it possible to reduce a communication amount between the camera body 100 and the interchangeable lens 101 and to simplify a process of calculating the correction ratio.

Figure 9:
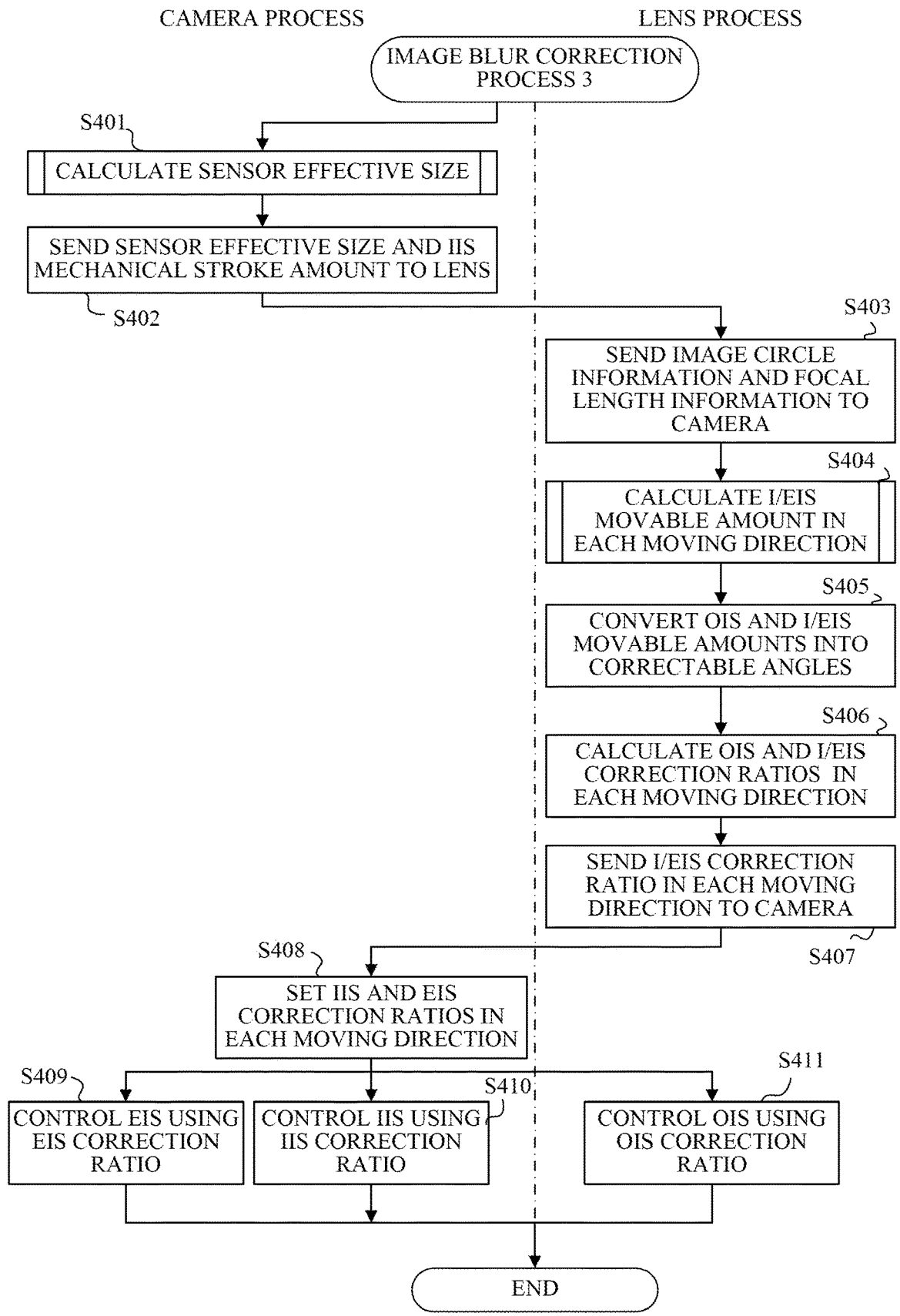
FIG. 9 is a flowchart of an image blur correction process performed in Embodiment 3 of the present invention.

FIG. 9 illustrates a flowchart of an image blur correction process 3 performed by the camera body 100 (camera MPU 102) and the interchangeable lens 101 (lens MPU 109). The process performed by the camera MPU 102 is illustrated on the left side of FIG. 9, and the process performed by the lens MPU 109 is illustrated on the right side thereof. The camera MPU 102 and the lens MPU 109 execute the respective processes according to computer programs.

When the camera body 100 is powered on to supply power to the interchangeable lens 101 and communication between the camera MPU 102 and the lens MPU 109 is started, the camera MPU 102 starts this process at step S401.

Figure 10:
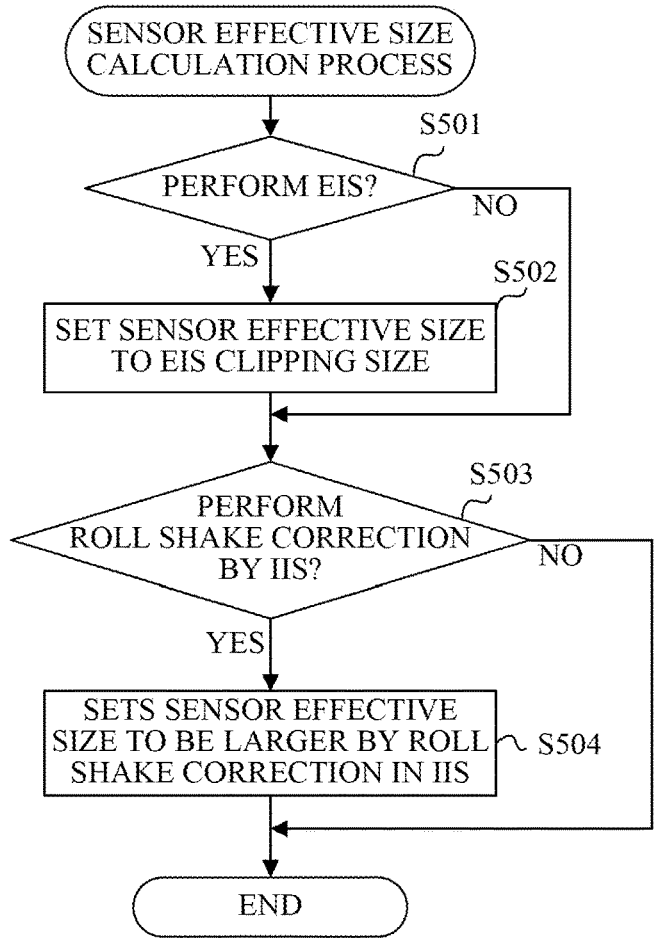
FIG. 10 is a flowchart of a sensor effective size setting process performed in Embodiment 3.

At step S401, the camera MPU 102 calculates the sensor effective size in consideration of the EIS correctable angle and the IIS roll shake correctable angle. In this calculation, the camera MPU 102 makes the calculated sensor effective size different from the actual size of the sensor readout area 4. Description will be made of the process of calculating the sensor effective size with reference to a flowchart of FIG. 10.

Figure 11:
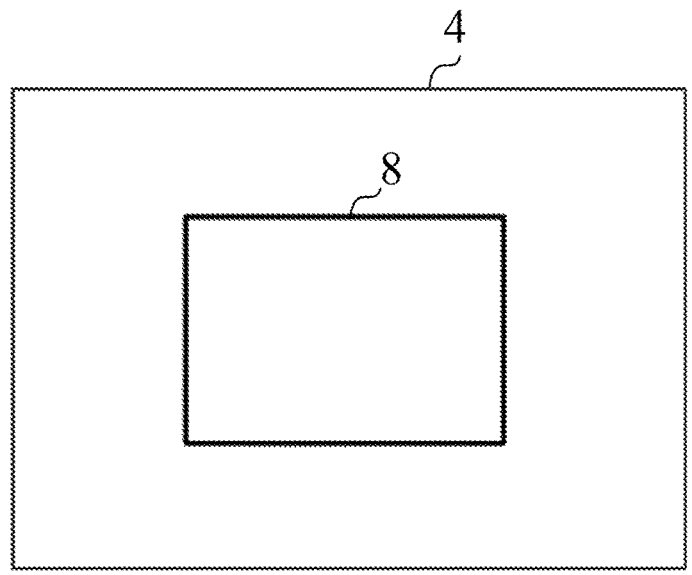
FIG. 11 illustrates a sensor readout area and an EIS clipping area in Embodiment 3.

At step S501, the camera MPU 102 determines whether or not to perform the EIS in the camera body 100. When performing the EIS, the camera MPU 102 proceeds to step S502 to set the sensor effective size to an EIS clipping size that is smaller than the actual size of the sensor readout area 4. FIG. 11 illustrates the sensor readout area 4 and an EIS clipping area 8 that is an image clipping area in the EIS. The EIS correctable angle is set depending on a maximum amount by which the EIS cropping area 8 can be moved within the sensor readout area 4. Further, a movable amount of the EIS clipping area 8 within the image circle 3 and within the IIS mechanical stroke range 2 is the sum of a movable amount of the EIS clipping area 8 within the sensor readout area 4 and the IIS movable amount.

Next at step S503, the camera MPU 102 determines whether or not to perform the roll shake correction by the IIS. When the roll shake correction is to be performed, the camera MPU 102 proceeds to step S504.

At step S504, the camera MPU 102 sets the sensor effective size that is larger than the actual size of the sensor readout area 4 or than the size of the EIS clipping area 8 when the process at step 502 has been performed.

Figure 12:
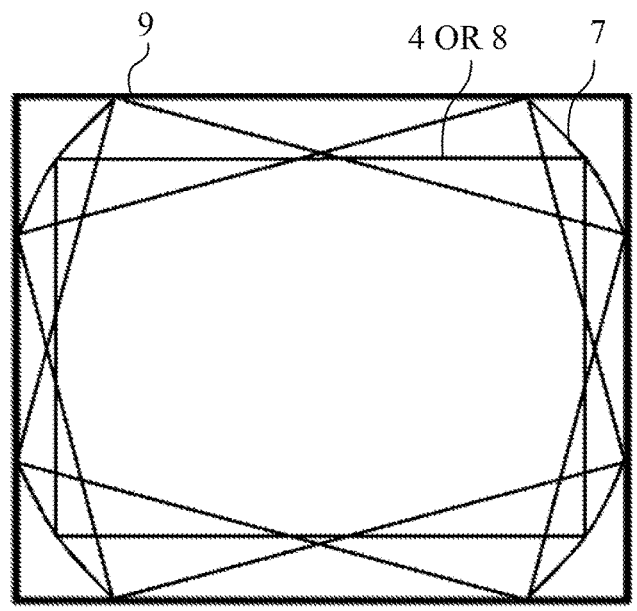
FIG. 12 illustrates a sensor effective size in Embodiment 3.

FIG. 12 illustrates the sensor effective size 9 in consideration of the roll shake correction amount of the IIS. The sensor effective size 9 is set as a rectangle including whole of a range 7 in which the sensor readout area 4 is rotated by the roll shake correction. This sensor effective size 9 is expressed by following expression (1). In expression (1), "*" represents multiplication.

$L_X' = L_X * \cos\theta_{Roll} + L_Y * \sin\theta_{Roll}$ $L_Y' = L_X * \sin\theta_{Roll} + L_Y * \cos\theta_{Roll}$ (1)

In expression (1), Lx' and Ly' respectively represents a horizontal width and a vertical width of the sensor effective size in consideration of the roll shake correction amount of the IIS, and Lx and Ly respectively represents a horizontal width and a vertical width of the sensor effective size that is the same as the sensor readout area 4. Further. $\theta_{Roll}$ represents the IIS roll shake correctable angle.

At step S103 in the first embodiment, since the area 7 within which the sensor readout area 4 can be rotated has a complicate shape, calculation of the IIS movable amount in the image circle 3 and in the IIS mechanical stroke range 2 becomes complicated. On the other hand, using the rectangular sensor effective size 9 in consideration of the roll shake correction as in this embodiment makes it possible to simply calculate the IIS movable amount.

Next at step S402 in FIG. 9, the camera MPU 102 sends the sensor effective size calculated at step S401 and the IIS mechanical stroke amount to the lens MPU 109. Since the sensor effective size sent at this time has been set in consideration of the EIS correctable angle and the IIS roll shake correctable angle, it is not necessary to send the EIS correctable angle and the IIS roll shake correctable angle to the lens MPU 109.

Next at step S403, the lens MPU 109 sends the image circle information and the focal length information to the camera MPU 102. The reason therefor is as described at step S102 in Embodiment 1. Thus, the camera MPU 102 acquires (receives) the image circle information and the focal length information.

Next at step S404, the lens MPU 109 calculates, using the sensor effective size, the image circle information and the IIS mechanical stroke amount, an I/EIS movable amount in each of the moving directions of the image sensor 104. The I/EIS means IIS+EIS. The method of calculating the I/EIS movable amount is the same as that described at step S103 in Embodiment 1. The sensor effective size has been set at step S401 in consideration of the EIS and the roll shake correction by the IIS, so that the I/EIS movable amount calculated at this step is the sum of the IIS movable amount in consideration of the roll shake correction and the EIS correctable angle (EIS movable amount).

Next at step S405, the lens MPU 109 converts the OIS movable amount and the I/EIS movable amount into correctable angles, respectively, by the same conversion method as described at step S104 in Embodiment 1.

At step S406, the lens MPU 109 as a setting unit calculates (sets) an OIS correction ratio (OIS+ and OIS− correction ratios) and an I/EIS correction ratio (I/EIS+ and I/EIS− correction ratios) in each of the moving directions. In this embodiment, the OIS correction ratio is a ratio of the OIS correction amount to a total image blur correction amount (angle [deg]) provided by the IIS, the EIS and the OIS, and the I/EIS correction ratio is a ratio of a correction amount (hereinafter referred to as "an I/EIS correction amount") provided by the IIS and the EIS to the above total image blur correction amount.

Next at step S407, the lens MPU 109 sends the I/EIS correction ratio calculated at step S406 to the camera MPU 102.

Then, at step S408, the camera MPU 102 calculates the EIS correctable angle and the IIS correctable angle, using the image circle information and the focal length information received from the lens MPU 109 at step S403. Further, at step S407, the camera MPU 102 divides the I/EIS correction ratio received from the lens MPU 109 depending on a ratio between the EIS correctable angle and the IIS correctable angle. Thus, the camera MPU 102 calculates an IIS correction ratio (IIS+ and IIS− correction ratios) and an EIS correction ratio (EIS+ and EIS− correction ratios) in each of the moving directions of the image sensor 104. The IIS correction ratio is a ratio of the IIS correction amount to the total image blur correction amount provided by the IIS, the EIS and the OIS. The EIS correction ratio is a ratio of a correction amount (hereinafter referred to as "an EIS correction amount) provided by the EIS to the above total image blur correction amount.

Next at step S409, the camera MPU 102 controls the EIS using the EIS correction ratio (EIS+ and EIS− correction ratios) calculated at step S408. Specifically, the camera MPU 102 calculates, depending on the camera shake detected by the camera gyro sensor 106 and the EIS correction ratio, the EIS correction amount that is a movement amount of the EIS clipping area. Then, the camera MPU 102 changes the position of the EIS clipping area depending on the calculated EIS correction amount to output a moving image.

At step S410 simultaneously with step S409, the camera MPU 102 controls the IIS, using the IIS correction ratio (IIS+ and IIS− correction ratios) calculated at step S408, as at step S107 in Embodiment 1.

Further, at step S411 simultaneously with step S409, the lens MPU 109 controls the OIS, using the OIS correction ratio (OIS+ and OIS− correction ratios) calculated at step S407, as at step S108 in Embodiment.

Thus, cooperative image blur correction by the OIS, IIS and EIS is performed.

In this embodiment, the camera MPU 102 changes the sensor effective size depending on the EIS correction amount and the roll shake correction amount of the IIS to send the changed sensor effective size to the lens MPU 109. Thus, the lens MPU 109 can calculate (set) the OIS correction ratio and the I/EIS correction ratio without considering the EIS correctable angle and the IIS roll shake correctable angle in the camera body 100. Therefore, this embodiment can reduce a communication amount between the camera body 100 and the interchangeable lens 101, and reduce a processing load on the lens MPU 109 when calculating each correction ratio.

Embodiment 4

In a camera system that is a fourth embodiment (Embodiment 4) of the present invention, the interchangeable lens 101 corresponds to a first optical apparatus and one optical apparatus, and the camera body 100 corresponds to a second optical apparatus and another optical apparatus. In Embodiment 4, the camera body 100 changes the initial position (hereinafter referred to as "an IIS initial position") of the movement of the image sensor 10, which is different from the other embodiments, in order to eliminate the necessity of calculating the IIS correction ratio in each of the moving directions of the image sensor 104. The interchangeable lens 101 calculates the OIS correction ratio and the IIS correction ratio, using the IIS movable amount received from the camera body 100. Then, the camera body 100 controls the IIS depending on the IIS correction ratio received from the interchangeable lens 101.

Figure 13:
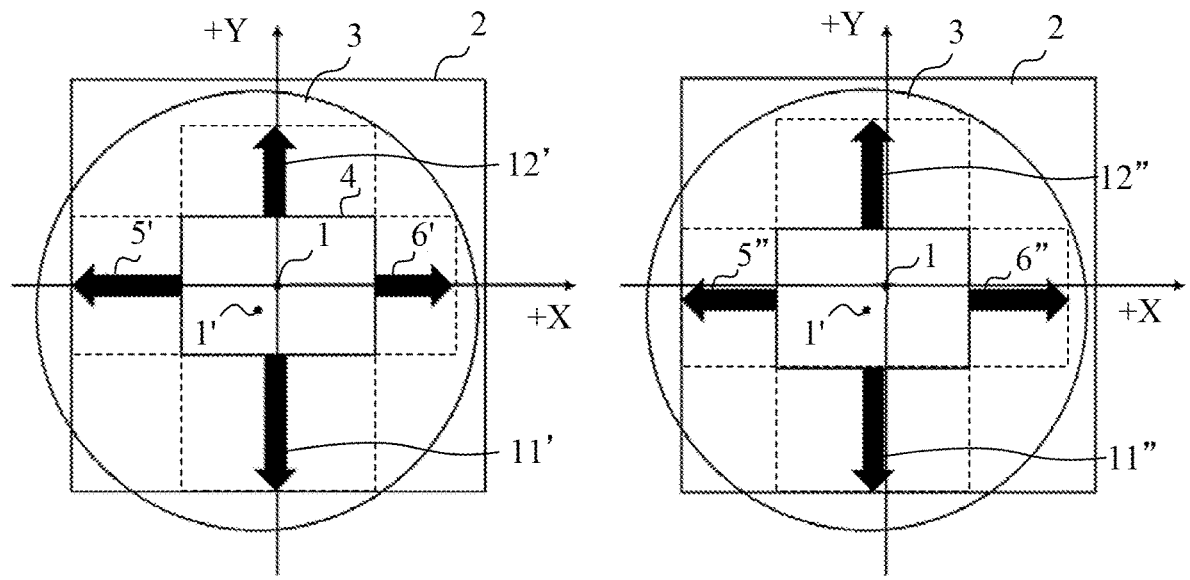
FIG. 13 illustrates a case where a center position of an image circle is shifted with respect to a center position 1 of an IIS mechanical stroke range in Embodiment 3.

With reference to FIG. 13, description will be made of the change of the IIS initial position. In the left and right parts of FIG. 13, as in FIG. 3, the case is illustrated where the center position 1' of the image circle 3 is shifted to the lower left with respect to the center position 1 of the IIS mechanical stroke range 2. In the left part of FIG. 13, a case is illustrated where the IIS movable amount 6' in the +X direction and the IIS movable amount 5' in the −X direction when the IIS initial position is located at the center position 1 of the IIS mechanical stroke range 2. The IIS movable amounts 5' and 6' are mutually different. Similarly, the IIS movable amount 12' in the +Y direction and the IIS movable amount 11' in the −Y direction are mutually different. Therefore, it is necessary to calculate and set the IIS correction ratio in each of the moving directions (+X, −X, +Y and −Y directions) of the image sensor 104 as in the other embodiments.

On the other hand, in the right part of FIG. 13, a case is illustrated where the IIS initial position is set to a position at which the same movable amount can be obtained in the + and − directions in each of the X and Y directions. In this case, the IIS movable amount 6" in the +X direction and the IIS movable amount 5" in the −X direction are equal to each other, and the IIS movable amount 12" in the +Y direction and the IIS movable amount 11" in the −Y direction are equal to each other. Therefore, it is not necessary to calculate the IIS correction ratio in each of the moving directions of the image sensor 104. That is, the same IIS correction ratio can be used in the +X direction and the −X direction, and the same IIS correction ratio can be used in the +Y direction and the −Y direction.

Figure 14:
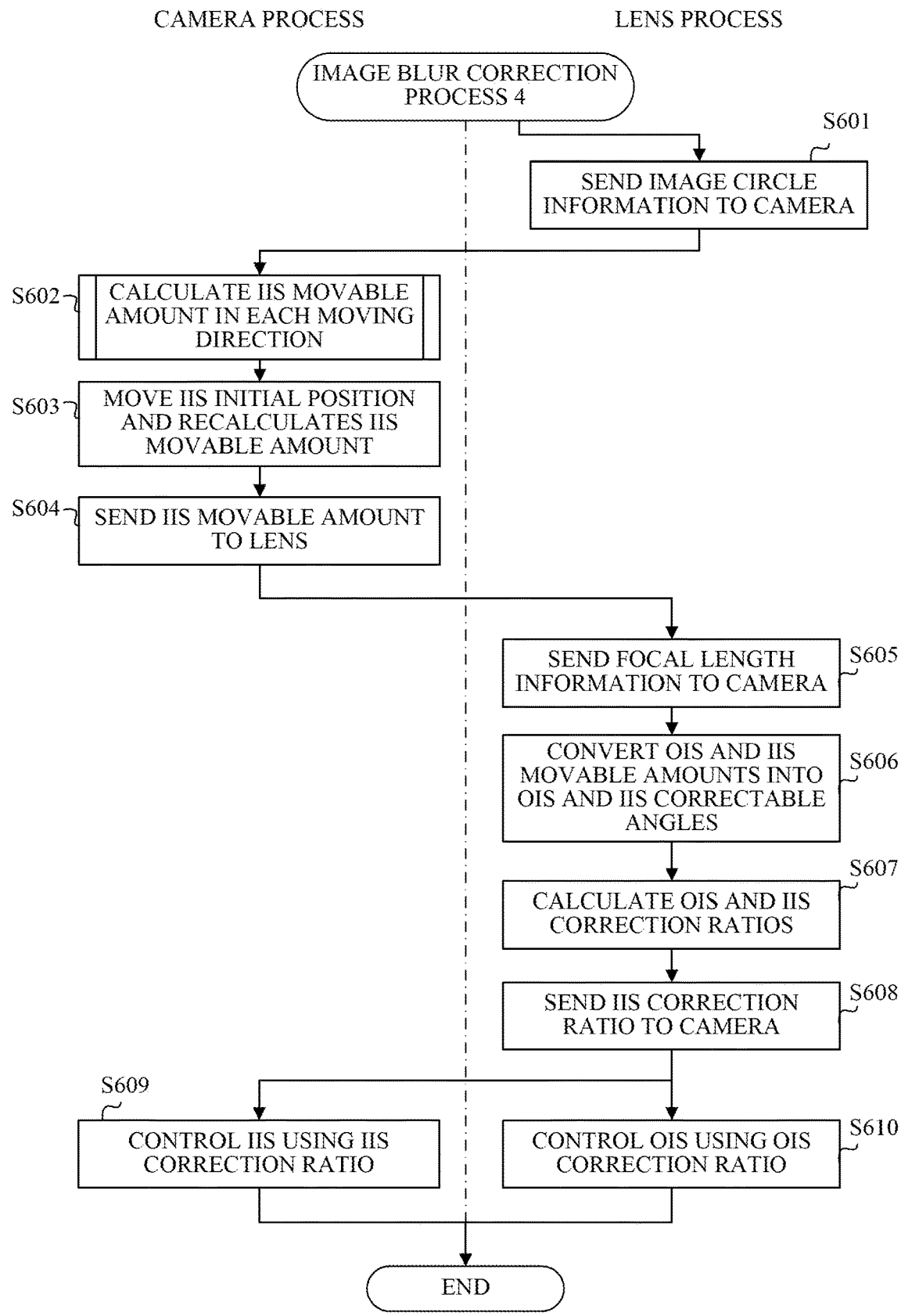
FIG. 14 is a flowchart of an image blur correction process performed in Embodiment 4 of the present invention.

FIG. 14 illustrates a flowchart of an image blur correction process 4 performed by the camera body 100 (camera MPU 102) and the interchangeable lens 101 (lens MPU 109). The process performed by the camera MPU 102 is illustrated on the left side of FIG. 14, and the process performed by the lens MPU 109 is illustrated on the right side thereof. The camera MPU 102 and the lens MPU 109 execute respective processes according to computer programs.

When the camera body 100 is powered on to supply power to the interchangeable lens 101 and communication between the camera MPU 102 and the lens MPU 109 is started, the lens MPU 109 starts this process at step S601.

At step S601, the lens MPU 109 sends the image circle information to the camera MPU 102. Thus, the camera MPU 102 acquires (receives) the image circle information.

Next at step S602, the camera MPU 102 calculates, using the sensor effective size, the image circle information and the IIS mechanical stroke amount, the IIS movable amount in each of the moving directions of the image sensor 104. The method of calculating the IIS movable amount is the same as that described at step S103 in Embodiment 1.

Next at step S603, the camera MPU 102 as a control unit moves the IIS initial position (that is, moves the image sensor 104) to a position at which the IIS movable amounts in the respective moving directions (+X and −X directions) calculated at step S602 become equal to each other. Then, the camera MPU 102 recalculates the IIS movable amount. In this calculation, since the IIS movable amounts in the respective moving directions are equal to each other, it is only necessary to calculate the IIS movable amount in one moving direction. The IIS movable amount after the movement of the IIS initial position is expressed by following expression (2).

$$d_x' = (d_x^+ + d_x^-)/2 \quad (2)$$

In expression (2), $d_x'$ represents the IIS movable amount in the +X direction and −X direction after the movement of the IIS initial position, $d_x^+$ represents the IIS movable amount in the +X direction, and $d_x^-$ is the IIS movable amount in the −X direction.

Next at step S604, the camera MPU 102 sends the IIS movable amount calculated at step S603 to the lens MPU 109. As described above, since the IIS movable amounts in the respective moving directions are equal to each other, it is only necessary to send the IIS movable amount in one moving direction to the lens MPU 109.

Next at step S605, the lens MPU 109 sends the focal length information of the image-capturing optical system to the camera MPU 102.

Next at step S606, the lens MPU 109 converts, as at step S104 in Embodiment 1, the OIS movable amount and the IIS movable amount respectively into the OIS correctable angle and the IIS correctable angle.

Next at step S607, the lens MPU 109 as a setting unit calculates (sets), from a ratio of the OIS correctable angle and the IIS correctable angle calculated at step S606, the OIS correction ratio and the IIS correction ratio. In this calculation, since the IIS correctable angle is common to the +X and −X directions, it is not necessary to calculate the IIS correction ratios in these directions.

Next at step S608, the lens MPU 109 sends the common IIS correction ratio in the +X and −X directions to the camera MPU 102. Then, at step S609, the camera MPU 102 controls the IIS, using the IIS correction ratio received from the lens MPU 109 at step S606, as at step S107 in Embodiment 1.

At step S610 simultaneously with step S609, the lens MPU 109 controls the OIS control, using the OIS correction ratio calculated at step S607, as at step S108 in Embodiment 1.

Thus, cooperative image blur correction by both the OIS and the IIS, that is, by the correction lens 113 and the image sensor 104 is performed.

In this embodiment, the IIS initial position is moved to the position at which the IIS movable amounts in the respective moving directions (+X and −X directions) of the image sensor 104 are equal to each other, so that the IIS correction ratios in the respective moving directions become equal to each other. This makes it possible to eliminate the necessity of calculating the IIS correction ratios in the respective moving directions. Therefore, it is not necessary to communicate the IIS correction ratios in the respective moving directions between the camera body 100 and the interchangeable lens 101, thereby reducing the communication amount therebetween. Further, it is not necessary to calculate the IIS correction ratios in the respective moving directions, so that the process load of the lens MPU 109 can be reduced.

Embodiment 1 described the case where the camera MPU 102 sends the sensor effective size, the IIS mechanical stroke amount and the IIS roll shake correctable angle to the lens MPU 109, and the lens MPU 109 calculates the IIS movable amount in each of the moving directions of the image sensor 104. However, the camera MPU 102 may calculate the IIS movable amount in each of the moving directions in advance using the image circle information and the focal length information to send them to the lens MPU 109, and the lens MPU 109 may calculate the IIS correction ratio depending thereon.

Further, Embodiment 3 described the case where the lens MPU 109 calculates the I/EIS movable amount and the I/EIS correction ratio. However, the camera MPU 102 may calculate the I/EIS movable amount and the I/EIS correction ratio. In this case, the camera MPU 102 may convert the sensor effective size into the sensor effective size in consideration of the roll shake correction amount to reduce the process load of the camera MPU 102 when calculating the I/EIS movable amount and the I/EIS correction ratio.

Figure 15:
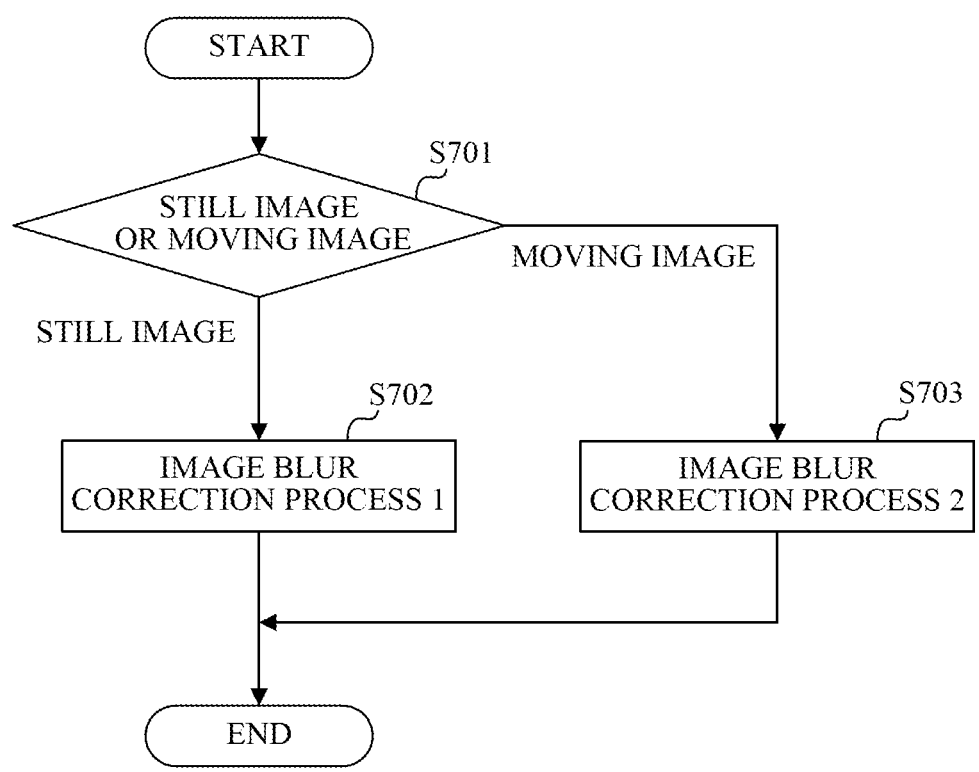
FIG. 15 is a flowchart of a process performed in another embodiment of the present invention.

Furthermore, a process may be performed in which the image blur correction process 1 described in Embodiment 1 is performed when the camera body 100 performs still image capturing, and the image blur correction processing 2 described in Embodiment 2 is performed when the camera body 100 performs moving image capturing. FIG. 15 illustrates this process performed by the camera MPU 102.

At step S701, the camera MPU 102 determines whether the camera body 100 performs still image capturing or moving image capturing. When performing the still image capturing, the camera MPU 102 proceeds to step S702 to perform the image blur correction process 1 with the lens MPU 109. On the other hand, when performing the moving image capturing, the camera MPU 102 proceeds to step S703 to perform the image blur correction process 2 with the lens MPU 109.

In this case, an appropriate image blur correction process can be selectively performed in the still image capturing and in the moving image capturing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167529, filed on Sep. 7, 2018 which is hereby incorporated by reference herein in its entirety.

What is claimed is:

1. A camera used in a camera system including a lens apparatus that is detachably attachable to the camera and includes an optical element movable for image blur correction, the camera comprising:
an image sensor movable for the image blur correction; and
at least one processor configured to set, in each blur direction of a plurality of blur directions, a ratio of image blur correction amounts provided respectively by movements of the optical element of the lens apparatus and the image sensor of the camera to a total blur correction amount, wherein the plurality of blur directions are distinguished from each other with respect to a sign of a direction, using information on an image circle formed by the lens apparatus, information on a mechanical movable amount of the image sensor, and information on a size of a signal readout area of the image sensor.

2. The camera according to claim 1, wherein the at least one processor is configured to set the ratio based on (a) an image blur correctable amount provided by movement of the image sensor determined by using the information on the image circle, the information on the mechanical movable amount of the image sensor, and the information on the size of the signal readout area, and (b) an image blur correctable amount provided by movement of the optical element.

3. The camera according to claim 1, wherein the information on the image circle is information on a center position of the image circle and one of a radius and a diameter of the image circle.

4. The camera according to claim 3, wherein the at least one processor is configured to set the ratio in each blur direction of the plurality of blur directions when the center position of the image circle is shifted from a center position of the signal readout area.

5. The camera according to claim 1, wherein the at least one processor is configured to send the ratio to the lens apparatus.

6. The camera according to claim 1, wherein the at least one processor is configured to set the ratio, when the image sensor is rotated for the image blur correction against roll shake, using a larger size of the signal readout area of the image sensor than an actual size of the signal readout area as the size of the signal readout area of the image sensor to be used for setting the ratio.

7. The camera according to claim 1, wherein the at least one processor is configured to set the ratio, when electronic image blur correction is performed on the image sensor, using a smaller size of the signal readout area of the image sensor than an actual size of the signal readout area as the size of the signal readout area of the image sensor to be used for setting the ratio.

8. A lens apparatus used in a camera system including a camera that includes an image sensor movable for image blur correction, the lens apparatus comprising:
an optical element movable for the image blur correction; and
at least one processor configured to set, in each blur direction of a plurality of blur directions, a ratio of image blur correction amounts provided respectively by movements of the optical element of the lens apparatus and the image sensor of the camera to a total blur correction amount, wherein the plurality of blur directions are distinguished from each other with respect to a sign of a direction, using information on an image circle formed by the lens apparatus, information on a mechanical movable amount of the image sensor, and information on a size of a signal readout area of the image sensor.

9. The lens apparatus according to claim 8, wherein the at least one processor is configured to set the ratio based on (a) an image blur correctable amount provided by movement of the image sensor determined by using the information on the image circle, the information on the mechanical movable amount of the image sensor, and the information on the size of the signal readout area, and (b) an image blur correctable amount provided by movement of the optical element.

10. The lens apparatus according to claim 8, wherein the information on the image circle is information on a center position of the image circle and one of a radius and a diameter of the image circle.

11. The lens apparatus according to claim 10, wherein the at least one processor is configured to set the ratio in each blur direction of the plurality of blur directions when the center position of the image circle is shifted from a center position of the signal readout area.

12. The lens apparatus according to claim 8, wherein the at least one processor is configured to send the ratio to the camera.

13. The lens apparatus according to claim 8, wherein the at least one processor is configured to set the ratio, when the image sensor is rotated for the image blur correction against roll shake, using a larger size of the signal readout area of the image sensor than an actual size of the signal readout area as the size of the signal readout area of the image sensor to be used for setting the ratio.

14. The lens apparatus according to claim 8, wherein the at least one processor is configured to set the ratio, when electrical image blur correction is performed on the image sensor, using a smaller size of the signal readout area of the image sensor than an actual size of the signal readout area as the size of the signal readout area of the image sensor to be used for setting the ratio.

15. A camera used in a camera system including a lens apparatus that is detachably attachable to the camera and includes an optical element movable for image blur correction, the camera comprising:
at least one processor configured to move an initial position of movement of an image sensor for the image blur correction to a position at which movable amounts of the image sensor in moving directions distinguished from each other with respect to a sign of a direction become equal, using information on an image circle formed by the lens apparatus.

16. The camera according to claim 15, wherein the at least one processor is further configured to set a ratio of image blur correction amounts provided respectively by movements of the optical element and the image sensor, the ratio being common to moving directions of each of the optical element and the image sensor.

17. A method of controlling a camera including an image sensor movable for image blur correction, the camera being used in a camera system including a lens apparatus that is detachably attachable to the camera and includes an optical element movable for the image blur correction, the method comprising the steps of:

acquiring information on an image circle formed by the lens apparatus, information on a mechanical movable amount of the image sensor, and information on a size of a signal readout area of the image sensor; and setting, in each blur direction of a plurality of blur directions, a ratio of image blur correction amounts provided respectively by movements of the optical element of the lens apparatus and the image sensor of the camera to a total blur correction amount, wherein the plurality of blur directions are distinguished from each other with respect to a sign of a direction, using the acquired information on the image circle, the information on the mechanical movable amount, and the information on the size of the signal readout area.

18. A method of controlling a lens apparatus including an optical element movable for image blur correction, the lens apparatus being used in a camera system including a camera that includes an image sensor movable for the image blur correction, the method comprising the steps of:

acquiring information on an image circle formed by the lens apparatus, information on a mechanical movable amount of the image sensor, and information on a size of a signal readout area of the image sensor; and setting, in each blur direction of a plurality of blur directions, a ratio of image blur correction amounts provided respectively by movements of the optical element of the lens apparatus and the image sensor of the camera to a total blur correction amount, wherein the plurality of blur directions are distinguished from each other with respect to a sign of a direction, using the acquired information on the image circle, the information on the mechanical movable amount, and the information on the size of the signal readout area.

19. A method of controlling a camera used in a camera system including a lens apparatus that is detachably attachable to the camera and includes an optical element movable for image blur correction, the method comprising the steps of:

acquiring information on an image circle formed by the lens apparatus; and moving an image sensor for the image blur correction to a position at which movable amounts of the image sensor in moving directions distinguished from each other with respect to a sign of a direction become equal, using the information on the image circle.

20. A computer-readable non-transitory storage medium storing a program for causing a camera including an image sensor movable for image blur correction, the camera being, used in a camera system including a lens apparatus that is detachably attachable to the camera and includes an optical element movable for the image blur correction, to execute the steps according to the method of claim 17.

21. A computer-readable non-transitory storage medium storing a program for causing a lens apparatus including an optical element movable for image blur correction, the lens apparatus being used in a camera system including a camera that includes an image sensor movable for the image blur correction, to execute the steps according to the method of claim 18.

22. A computer-readable non-transitory storage medium storing a program for causing a camera including an image sensor movable for image blur correction, the camera being used in a camera system including a lens apparatus that is detachably attachable to the camera and includes an optical element movable for the image blur correction, to execute the steps according to the method of claim 19.

* * * * *